United States Patent [19]

French

[11] Patent Number: 4,495,765
[45] Date of Patent: Jan. 29, 1985

[54] WAVE-ENERGY CONVERTER

[76] Inventor: Michael J. French, United Kingdom Atomic Energy Authority, 11 Charles II St., London, SW1Y 4QP, England

[21] Appl. No.: 547,645

[22] Filed: Nov. 1, 1983

Related U.S. Application Data

[60] Division of Ser. No. 361,973, Mar. 25, 1982, abandoned, which is a continuation of Ser. No. 94,855, Nov. 16, 1979, Pat. No. 4,341,074.

[30] Foreign Application Priority Data

Feb. 9, 1979 [GB] United Kingdom ................ 7904658

[51] Int. Cl.³ ............................................ F03B 13/12
[52] U.S. Cl. ...................................... 60/398; 60/504; 290/53; 417/331
[58] Field of Search ................ 60/398, 497, 500, 504, 60/496; 417/330, 331; 290/42, 53

[56] References Cited

U.S. PATENT DOCUMENTS

| | | | |
|---|---|---|---|
| 1,346,399 | 7/1920 | Crawford-Frost | 60/504 |
| 3,758,083 | 9/1973 | Palmer | 417/331 X |
| 3,758,788 | 9/1973 | Richeson | 60/500 X |
| 4,268,226 | 5/1981 | Morris | 60/500 X |

Primary Examiner—Stephen F. Husar
Attorney, Agent, or Firm—William R. Hinds

[57] ABSTRACT

The invention provides a device for converting wave energy into useful work, and comprises a body adapted to be moved to and fro by waves on a liquid, and means such as a hydraulic piston in a cylinder for converting this movement of the body into a power output. The body may be disposed about a horizontal cable along which the to and fro movement of the body is arranged to occur, the cable being secured to the piston so that relative movement between the body and the cable results in displacement of the piston in the cylinder. A plurality of said cables may be threaded through the body, and some of these cables may be in mutually perpendicular relationship to each other to provide a device having an omnidirectional wave energy conversion capability.

7 Claims, 15 Drawing Figures

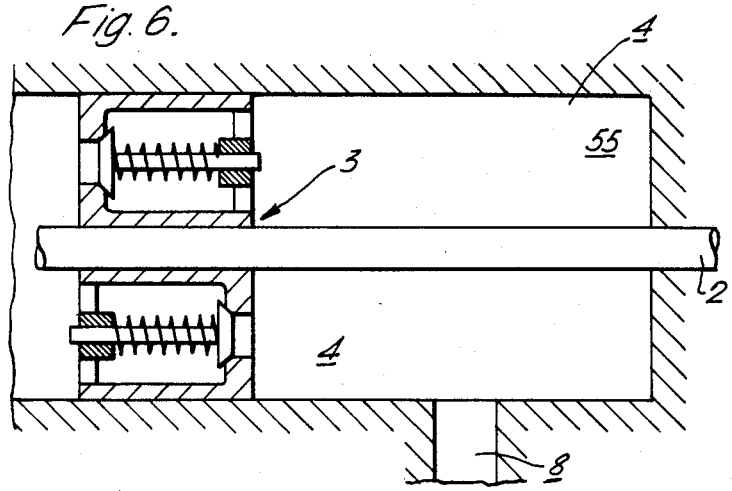
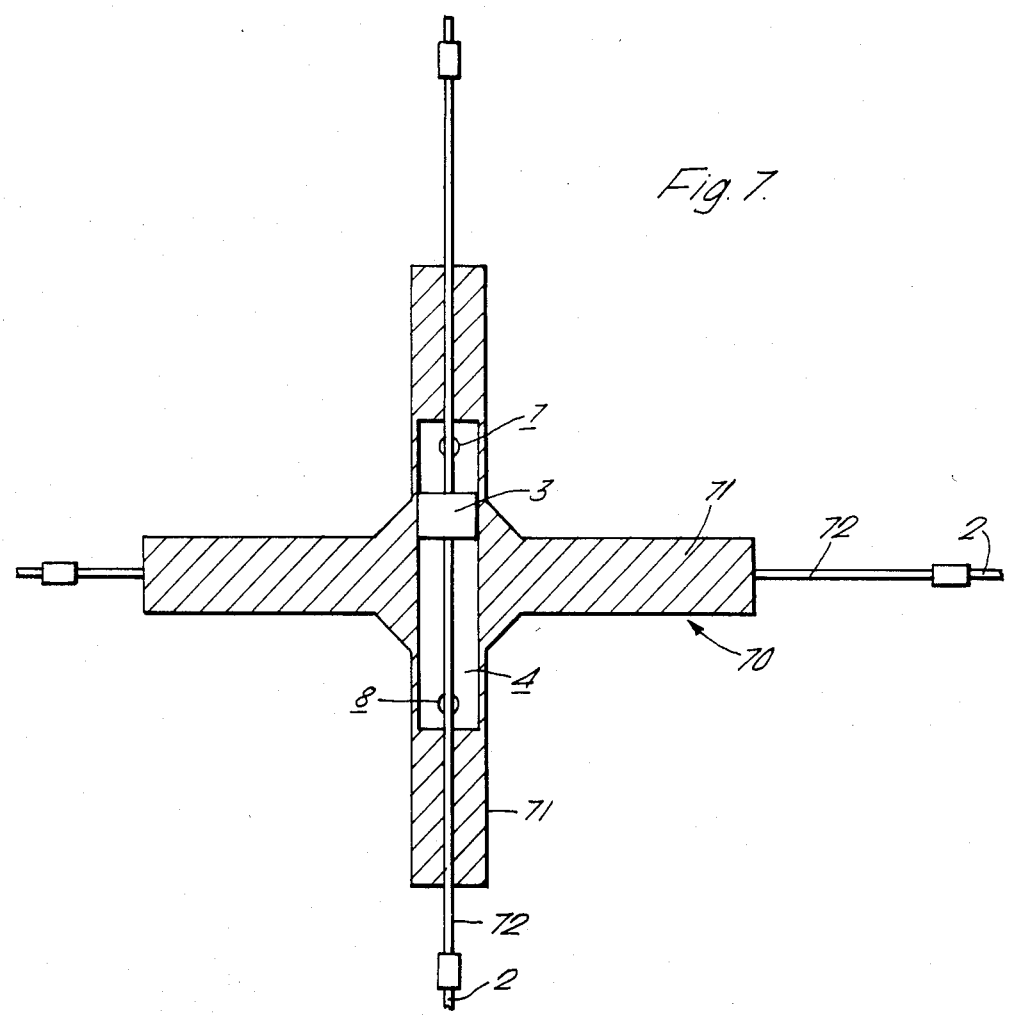

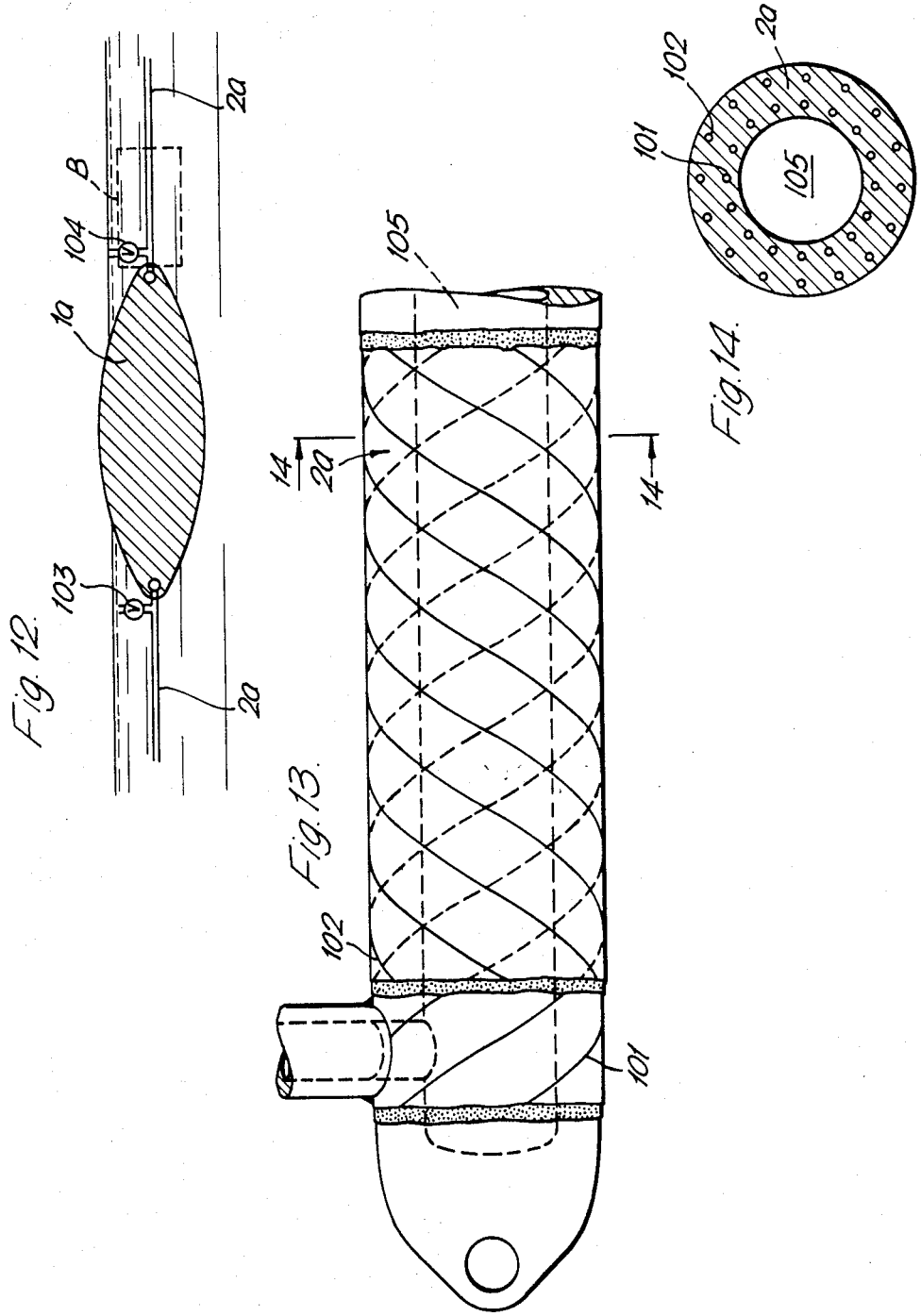

WAVE-ENERGY CONVERTER

This is a division of application Ser. No. 361,973 filed Mar. 25, 1982, which is a continuation of Ser. No. 94,855, filed Nov. 16, 1979, now U.S. Pat. No. 4,341,074.

This invention relates to devices for converting the energy of waves on a liquid into useful work, for example into hydraulic or electric power.

According to the present invention there is provided a device for converting wave energy into useful work, the device comprising a body adapted to be moved to and fro by waves on a liquid, and means for converting the to and fro movement of the body into useful work.

Preferably, the body is adapted to be just buoyant in the liquid.

Desirably, said means includes an elongate member adapted to extend through the body and about which elongate member said to and fro movement of the body is arranged to occur, and a plurality of said bodies may be about a common elongate member.

A plurality of said means may be provided, and at least some of said means may be aligned in substantially perpendicular angular relationship to each other so as to provide a device having a substantially omnidirectional wave energy conversion capability.

Examples of said means may comprise a hydraulic piston and cylinder means, or a rack and pinion means adapted to drive a rotatable power output means.

Preferably, said hydraulic piston and cylinder means form part of a power output system controllable from means for sensing the height of waves moving the body.

The invention will now be further described by way of example only with reference to the accompanying drawings in which:

FIG. 6 shows to an enlarged scale a fragmentary side sectional view of another part of the system of FIG. 5;

FIG. 7 shows a plan sectional view of an alternative form of wave energy converter;

FIG. 12 shows a diagrammatic side sectional view of another alternative wave-energy converter;

FIG. 13 shows enlarged and partly cut away the portion within the box B indicated in FIG. 12, and FIG. 14 shows a sectional view on line 14—14 of FIG. 13.

In the above Figures, like parts have like numerals.

Figure 1:
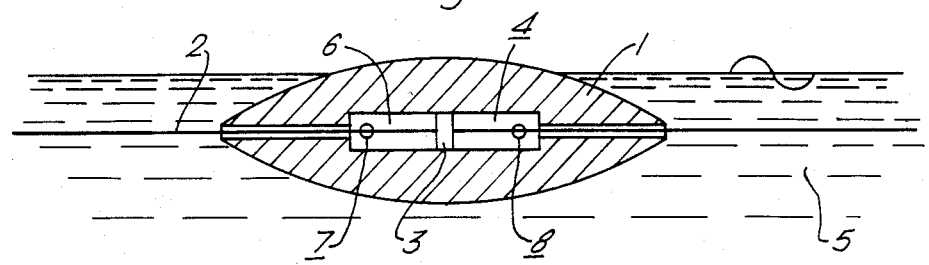
FIG. 1 shows a side sectional view of a wave-energy converter.

Referring now to FIG. 1, the essential components of a wave-energy converter are shown and comprise a body 1 which may be of almost any shape but is preferably roughly lenticular in form, threaded on an elongate member comprising a cable 2 in a liquid 5 (e.g. the sea), the body 1 being just buoyant in the liquid 5. The cable 2 is arranged to lie substantially horizontally in the liquid 5 and the ends (not shown) of the cable are fixed remotely from the body 1 which is able to move to and fro along the cable 2 under the action of waves on the liquid 5.

A system for extracting energy from this to and fro movement of the body 1 comprises a piston 3 secured to the cable 2 so as to slide in a cylinder 4 containing a fluid 6 (e.g. hydraulic fluid or water) in the body 1. Ducts 7 and 8 near respective ends of the cylinder 4 connect with a power output system (not shown).

In use, the body 1 may be arranged to float in the liquid 5, or be held just below the surface by a local submerged mooring (not shown). Alternatively, the buoyancy of the body 1 may be arranged so that the body 1 lies just below the surface of the liquid 5, for example by controlling its buoyancy either side of neutral buoyancy in a manner similar to the use of a swim bladder by a fish so as to regulate the height of the body 1 in the liquid 5.

In operation, energy is extracted from the waves on the liquid 5 by the to and fro or reciprocating motion of the body 1 in response to the waves causing relative displacement of the piston 3 in the cylinder 4 and thereby displacement of fluid 6 from and into, the cylinder 4 through the ducts 7 and 8 to perform useful work, for example by driving a hydraulic motor (not shown).

Figure 2:
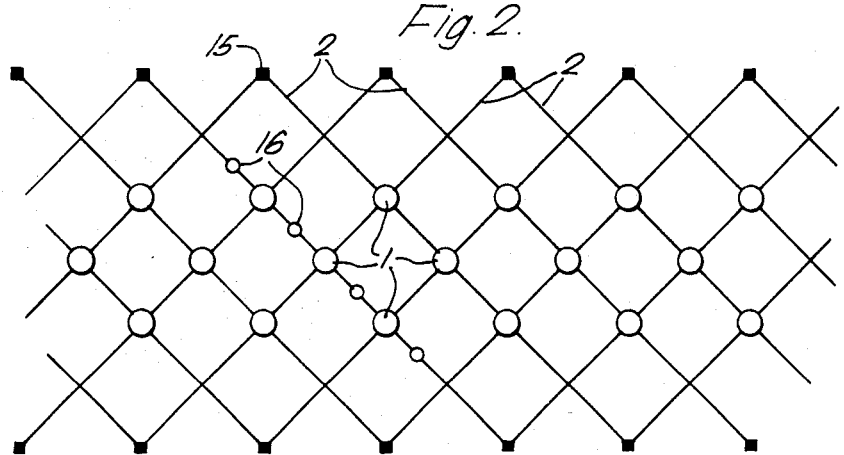
FIG. 2 shows in plan and to a reduced scale an arrangement having a plurality of wave-energy converters of FIG. 1.

Several bodies 1 may be placed about each cable 2 as shown in FIG. 2 to which reference is made, each body 1 having a cylinder 4 (not shown) in which a piston 3 (not shown) is slidably disposed. Each body 1 may be threaded onto two cables 2, each cable 2 having a piston 3 located in a cylinder 4, in roughly mutually perpendicular directions in a net-like arrangement to make each body 1 substantially omnidirectional in energy-extraction ability.

The cables 2 in the net-like arrangement shown in FIG. 2 are anchored to moorings 15 and may have weights 16 attached to them between adjacent bodies 1, or between respective bodies 1 and moorings 15 to provide desirable characteristics of tension and stiffness. The ends (not shown) of the cables 2, preferably those at the inshore ends, may be connectable to cable winches (not shown) by which the length of respective cables 2 may be slightly adjusted to vary the mean tension in the cable 2, or to allow for the effect of tides. The spacing of the bodies 1 on the cables 2 may conveniently be about 75 meters apart. The cables 2 may be made of natural fibres, or artificial fibres such as polymer cables. When cables 2 of heavier materials are used, floats (not shown) may be attached to the cables 2 to hold the cables 2 at the surface of the liquid 5.

Figure 3:
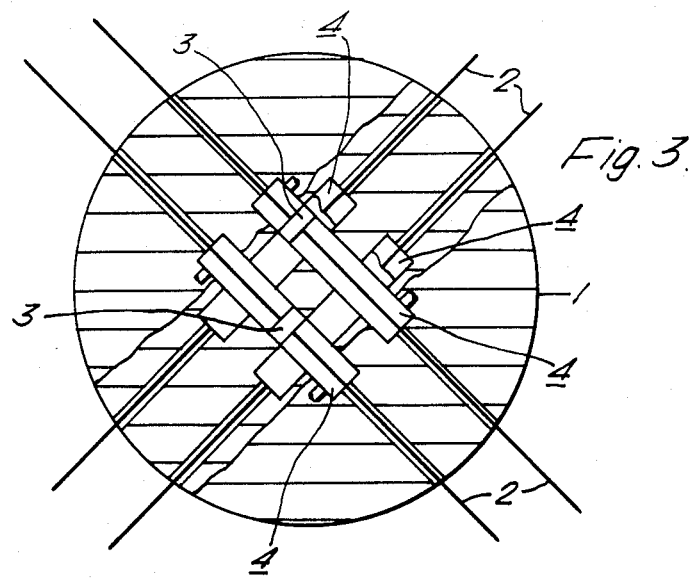
FIG. 3 shows a plan sectional view of an alternative wave-energy converter for use in the arrangement of FIG. 2.

As shown in FIG. 3, each body 1 may be threaded onto two or more parallel cables 2 (only two are shown), each cable 2 having a piston 3 in a cylinder 4 in the respective body 1 preferably in an out-of-phase relationship with the other piston(s) 3, and the cables 2 may be aligned in mutually, perpendicular directions. The cylinders 4 may be connected to a common power output system (not shown) or may be individually connected to a respective power output system.

Figure 4:
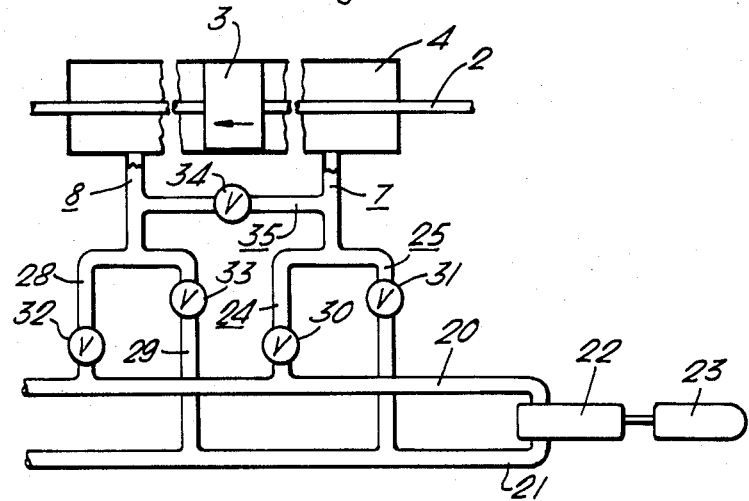
FIG. 4 shows a diagrammatic representation of a power output system for the converters of FIG. 1, or 3.

Referring now to FIG. 4, a power output system for the wave energy converter of FIGS. 1 and 3 is shown and comprises a low pressure duct 20 and a high pressure duct 21 connected to respective sides of a hydraulic motor 22 drivably connected to an electric generator 23. The duct 7 from the cylinder 4 connects to a duct 24 leading to the low pressure duct 20 and a duct 25 leading to the high pressure duct 21. Similarly, the duct 8 from the cylinder 4 connects to a duct 28 leading to the low pressure duct 20 and a duct 29 leading to the high pressure duct 21. A respective shut-off valve 30, 31, 32, or 33 is inserted in a respective duct 24, 25, 28 or 29. A duct 35 is connected between the ducts 7 and 8 and has a shut-off valve 34.

The power system of FIG. 4 may be arranged to operate in a particular regime by appropriate opening of selected valves 30, - - - 34, and four such regimes will now be described with reference to relative motion of the piston 3 in the direction of the arrow:

| Regime | Valves Open | Description |
| --- | --- | --- |
| A | 33, 30 | Normal operation to drive the hydraulic motor 22 |
| B | 34 | The two sides of the piston 3 are connected together so that the body 1 moves freely on the cable 2 |
| C | None | The piston 3 is hydraulically locked in the cylinder 4 |
| D | 32, 31 | High pressure fluid is admitted to the cylinder 4 through duct 7 to assist the motion of the body on the cable 2 |

When the piston 3 moves in the reverse direction Regimes A and D are as follows:

| | | |
| --- | --- | --- |
| (B, C) | | (Unchanged) |
| A | 31, 32 | Normal operation to drive the hydraulic motor 22 |
| D | 33, 30 | High pressure fluid is admitted to the cylinder 4 through duct 8 to assist the motion of the body on the cable 2. |

The valves 30, - - - 34, may be manually operated or controlled by a system (not shown) responsive to a hydrostatic transducer (not shown) which senses the passage of waves by measuring fluctuations in hydrostatic pressure due to wave height, and switches the power system of FIG. 4 individually from one regime (A, B, C or D) to another as a function of wave height. A switching sequence for the valves 30, - - - 34, relative to wave height to extract as much energy as possible from the waves would be as follows:

For a short wave, starting from the passage of a crest ($\phi = 0°$) for the next 360° of phase,
0-180°, A, 180°-360°, A (reversed) for a longer wave (say, of period 12 sec.)
0°-40°, C; 40°-140°, A; 140°-220°, C; 220°-320°, A (reversed).

Regimes B and D are used only to recover the best position to take advantage of a large wave (signalled by bodies 1 ahead of the body 1 in question on the cable 2).

Several cylinders 4 (not shown) may be connected to the low pressure duct 20 and the high pressure duct 21.

Figure 5:
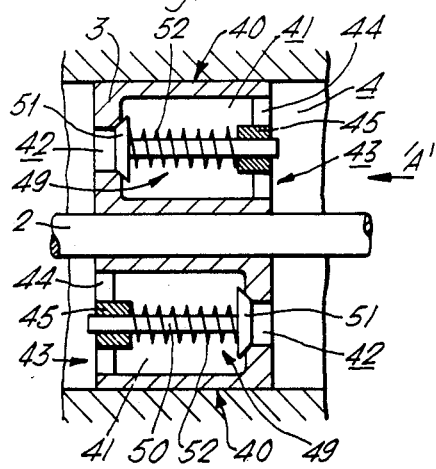
FIG. 5 shows to an enlarged scale a fragmentary side sectional view of part of the system of FIG. 4.
Figure 5A:
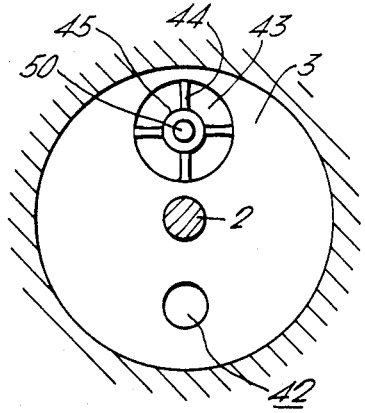
FIG. 5a shows a view in the direction of arrow 'A' of FIG. 5.

In order to prevent overloading of the piston 3, suitable relief valves may be incorporated therein as shown in FIGS. 5 and 5a to which reference is made. The piston 3 shown in FIGS. 5 and 5a has two relief valves 40 disposed in opposite relationship, each relief valve 40 comprising a cylindrical chamber 41 having an inlet 42, and an outlet 43 provided by the space between a bearing portion 45 held by four equi-spaced webs 44, and the side of the chamber 41 to which the webs 44 extend. A valve member 49 has a stem 50 slidably located in the bearing portion 43 and a frusto-conical disc 51 positioned at the inlet 42. A compression spring 52 urges the disc 51 in a direction to close the inlet 42 until excessive pressure of the fluid 6 on the disc 51 overcomes the reilience of the spring 52 to allow the fluid 6 to flow through the inlet 42 into the chamber 41 and exhaust through the outlet 43.

The relief valves 40 operate in overload conditions, and may also be used as shown in FIG. 6 to resist overtravel of the piston 3 when the piston 3 moves beyond the duct 7 or 8 into a damping chamber 55 near the respective end of the cylinder 4.

The invention has been described with reference to a buoyant body of roughly lenticular shape, and such a shape is preferred because the turbulence losses thereof are relatively low in comparison with those of other shapes. Other shapes, however, may be used, for example for economy of material such as the cruciform shape as shown in FIG. 7 to which reference is now made.

In FIG. 7 a body 70 is shown having arms 71 arranged in a cruciform shape and of buoyant construction, and has s system for extracting energy from to and fro movement of the body 70 similar to that described in relation to the wave energy converter of FIGS. 1 to 6, the system comprising a cylinder 4 in which a piston 3 is disposed. The piston 3 is secured to a rod 72 which extends through the body 70 and is joined at each end to a cable 2. To and fro movement of the body 70 in response to waves results in a fluid 6 being displaced from the cylinder 4 to perform useful work as described in relation to FIGS. 1 to 6. The body 70 may have several such rods 72 extending therethrough as shown in FIG. 8 to which reference can be made, each rod 72 having a piston 3 (not shown) secured thereto in a cylinder 4 (not shown).

Figure 9:
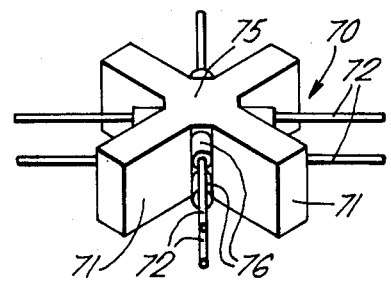
FIG. 9 shows a perspective view of another alternative form of wave-energy converter.

The rods 72 are shown as extending through the arms 71 of the body 70, but may be arranged as shown in FIG. 9 to which reference is made to extend in a cruciform manner at a 45° displacement with respect to the arms 71 through a hub portion 75 of a body 70 in which the cylinders 4 (not shown) are located. Tubular extensions 76 from the hub portion 75 provide additional space for the cylinders 4.

Figure 8:
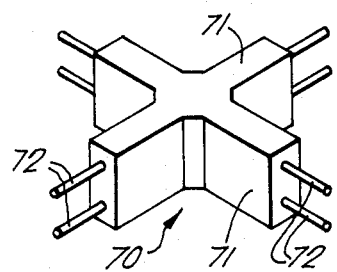
FIG. 8 shows to a reduced scale a perspective view of the converter of FIG. 7.
Figure 10:
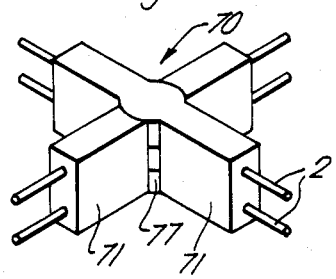
FIG. 10 shows a perspective view of a modified form of the converter of FIG. 8.

The bodies 70 of FIGS. 7 to 9 may be provided, as shown in FIG. 10 to which reference is made, with arms 71 hingedly connected together at their intersection by a hinge 77 to allow the body 70 to be collapsed, for example for load shedding.

Figure 11:
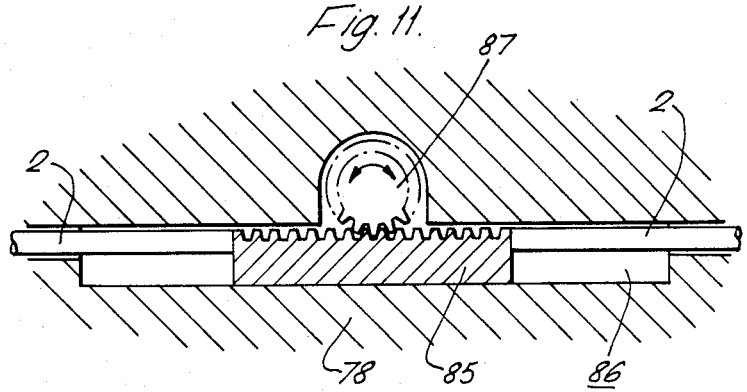
FIG. 11 shows to an enlarged scale a fragmentary side sectional view of a modified form of the converter of FIG. 1.

The invention has been described in relation to the use of a hydraulic piston for extracting energy from movement of the buoyant body but other systems, preferably straight line motion systems, may be used such as a rack and pinion as shown in FIG. 11 to which reference is now made.

In FIG. 11, a cable 2 is connected at each end of a rack 85 in a chamber 86 and engaged with a pinion 87. The chamber 86 is defined by a body 78 which may be similar to any of those shown in FIGS. 1 and 7 to 10, so that to and fro motion of the body 78 in response to waves causes a corresponding relative displacement of the rack 85 in the chamber 86 which thereby rotates the pinion 87. The pinion 87 may be connected to a hydraulic pump (not shown) or to an electric generator (not shown) to provide a power output, suitable known means being provided, such as a semi-rotary vane pump, or cranks and rams, or sprag clutches, to convert the oscillatory motion of the pinion 87 into a unidirectional output.

The bodies 1, 70 or 78 of FIGS. 1 and 7 to 11 may be, for example, of hollow concrete or steel construction, or of other materials, particularly of inflatable rubberised cloth since such a body could be readily transported in a collapsed state.

It will be understood that microprocessors or computers may be used in the control system of FIG. 4.

Although the invention has been described in relation to an elongate member comprising a cable or a rod, alternative elongate members may be used and may comprise for example a chain.

It will also be appreciated that the energy extraction system may be located between adjacent bodies instead of being inside the bodies. In such an arrangement for example, the cable might have an end attached to a hydraulic cylinder and another end attached to a piston, or the bodies might be connected together by the fluid displacement devices of copending British patent application No. 7925350 which replace the aforementioned cables as illustrated in FIGS. 12 to 14, in which the fluid displacement device comprises a tubular tie member 2a comprising an elastomeric material such as natural rubber reinforced with layers of helically wound relatively inelastic filaments 101, 102 such as carbon fibers, glass fibers, steel or natural fibers such as cotton, or plastics such as nylon or polypropylene. Adjacent pairs 101, 102 (see FIG. 14) of layers have their filaments wound in opposite relationship to provide a balance between the left-hand and the right-hand reinforcements of the tie members 2a. Outlet and inlet valves 103, 104 are at the respective ends of the tie member 2a. The tie member 2a is connected to a respective body 1a at each end in a configuration as illustrated for bodies 1 in FIG. 2 and when axial tensioning load is applied to the tie member by the to and fro movement of the bodies 1a, the bore 105 of the tie member 2a is reduced in volume and discharges a fluid through the outlet valve 103. When the movement of the bodies 1a is such as to release axial tensioning load on the tie member, relaxation of the tie member 2a is accompanied by an increase in volume of the bore 105 which allows fluid to be drawn into the bore 105 through the inlet valve 104. The fluid displaced by the tie member 2a could be used to drive a hydraulic motor in a similar manner to that described in relation to the devices of FIGS. 1 to 10. Thus, for example, the hydraulic motor 22 of FIG. 4 could be driven with the valves 30 through 34 set for normal operation (regime A) simply by connecting the ducts 7 and 8 as marked on FIG. 4 with the bore 105 of the tie member 2a in place of the piston and cylinder 3, 4.

I claim:

1. A device for converting the energy of waves on a liquid into useful work, the device comprising a plurality of bodies each being just buoyant in the liquid, a plurality of tubular elongate tie members arranged to be disposed between the bodies in substantially horizontal directions in the liquid to form a net-like arrangement with a respective body connected at each of the notional intersections of the elongate members for reciprocating horizontal motion relative to adjacent bodies, the bodies being spaced apart so that waves cause reciprocating horizontal displacement of the bodies relative to one another, each elongate member defining a bore therein adapted to contain a fluid and comprising an elastomeric material reinforced with layers of helically wound relatively inelastic filaments, such that application of an axial tensioning load on the elongate member causes a reduction in volume of the bore and thereby discharge of the fluid from the bore, adjacent layers of the filaments having the filaments thereof wound in opposite relationship, inlet valve means and outlet valve means connected to the bore, and means for performing useful work from discharge of the fluid from the bore through the outlet valve means, the arrangement being such that reciprocating horizontal relative motion of the bodies in response to waves causes corresponding changes in elongation of the elongate members and thereby discharge of the fluid to the work performing means.

2. A device as claimed in claim 1, wherein the fluid comprises a liquid, and a respective hydraulic motor means is connected to the outlet valve means of each elongate member, so as to be driven by the liquid discharged through the outlet valve means.

3. A device as claimed in claim 1 wherein, apart from the restraint imposed by said tie members, said bodies are unrestrained against relative movement bodily in any direction over distances at least sufficient to elongate the tie members under axial tension load.

4. A device as claimed in claim 1 wherein said bodies are connected by said tie members so as to be capable of rectilinear reciprocation relative to adjacent bodies.

5. A device as claimed in claim 1 wherein the body is substantially lenticular in shape.

6. A device as claimed in claim 1, including a plurality of weights secured to the net-like arrangement of the elongate members to provide a desired characteristic of tension and stiffness in the elongate members.

7. A device as claimed in claim 1, wherein each body is of inflatable construction.

* * * * *